United States Patent [19]
Johnson et al.

[11] Patent Number: 4,928,726
[45] Date of Patent: May 29, 1990

[54] CROSSARM VALVE SEAT WITH PULLING LEDGE

[75] Inventors: Jerry E. Johnson; Clinton C. Hoerner, Jr., both of Houston, Tex.

[73] Assignee: TRW Inc., Cleveland, Ohio

[21] Appl. No.: 212,936

[22] Filed: Jun. 29, 1988

[51] Int. Cl.⁵ .................................... F16K 15/02
[52] U.S. Cl. .................. 137/327; 137/516.29; 417/454
[58] Field of Search ........... 137/327, 516.29, 902; 417/454

[56] References Cited

U.S. PATENT DOCUMENTS

| | | | |
|---|---|---|---|
| 1,721,114 | 7/1929 | Hampton et al. | 251/362 |
| 2,271,137 | 1/1942 | Hamer | 137/327 |
| 2,447,729 | 8/1948 | Bertea | 251/144 |
| 2,505,992 | 5/1950 | Rike et al. | 251/144 |
| 3,107,895 | 10/1963 | Vogeli | 251/329 |
| 3,474,808 | 10/1969 | Elliott | 137/327 X |
| 3,742,976 | 7/1973 | Bailey | 137/516.29 |
| 3,811,470 | 5/1974 | Schaefer | 137/540 |
| 4,180,097 | 12/1979 | Sjoberg | 137/516.29 |
| 4,520,842 | 6/1985 | Elliott | 137/327 |
| 4,632,141 | 12/1986 | Post | 137/327 |

Primary Examiner—Robert G. Nilson

[57] ABSTRACT

A valve seat member (18) presenting a valve seat surface (20) at one end against which an associated valve (16) seals. A valve stem guide (36) is supported in a central flow passage (34) of the valve seat member (18) by two diametrically opposed arms (38). An annular abutment surface (44) extends radially into the flow passage (34) and is spaced axially below the valve seat surface (20) and above the arms (38) for providing a ledge with which a removal tool (42) engages to extract the valve seat member (18) from a slush pump deck (12). The associated valve (16) includes a valve body (72) having a shape defined by a segment of a sphere centered at the apex (70) of a cone (68) which simultaneously defines the shape of a peripheral sealing face (74) of the valve body (72) and the shape of the valve seat surface (20).

18 Claims, 4 Drawing Sheets

CROSSARM VALVE SEAT WITH PULLING LEDGE

TECHNICAL FIELD

The subject invention relates to an assembly for regulating fluid flow in a pump, and more particularly to a valve seat member including an axially disposed valve stem guide having radially extending support arms in the flow passage.

BACKGROUND ART

When boring holes deep into the earth, it is common to employ a slush pump to remove slush, mud and other liquid debris from the drilling hole. Such slush pumps, due to their highly abrasive work environment, require frequent repair and inspection. For this reason, it is necessary to provide the slush pump with easily accessible and removable internal components.

Slush pumps of this type commonly include spring biased valves which matingly engage and seal against the valve seat surface of an associated valve seat for regulating the fluid flow through the pump. In the prior art, slush pump valve seats are of two types: either a full open type or a crossarm type; the distinction between the two types being the absence or presence of special valve guiding structure in the flow passage. The full open type valve seats are characterized by an unobstructed internal flow passage. The prior art crossarm type valve seat are characterized by a plurality of arms disposed in the internal flow passage which support an axially positioned valve stem guide.

During extraction of the prior art valve seats from a slush pump for inspection or replacement, one type of removal tool is employed for extracting a full open type valve seat and another type of removal tool is required for extracting a crossarm type valve seat. More specifically, the full open type seat is extracted from the slush pump by inserting a removal tool completely through the internal flow passage. The removal tool emerges through the bottom of the full open valve seat and is then hooked underneath the bottom and pulled upwardly until the valve seat becomes dislodged from the slush pump. The crossarm type valve seats are extracted from the slush pump by inserting into the flow passage a removal tool which, in contradistinction, is hooked underneath each of the arms and then urged upwardly against the arms in the flow passage to dislodge the valve seat from the slush pump. The removal tool used for the full open type valve seats is incompatible with the crossarm type valve seats as the arms and valve guiding structure in the flow passage prevent the removal tool from being inserted completely through the flow passage to hook underneath the seat. Likewise, the crossarm type removal tool is incompatible with the full open type valve seats in that there are no arms in the flow passage under which the tool may hook.

Because of the extremely large force, typically in the order of several tons, which is required to dislodge a valve seat from the slush pump, the arms of the crossarm type valve seat must be of sufficient structural integrity to withstand the removal process. In other words, a dilemma is presented for the engineer in that the arms must have a large enough cross-section to provide adequate strength to withstand the removal process, but not so large as to overly restrict the fluid flow through the valve seat.

Therefore, due to the practical realities of removing a valve seat from a slush pump, there has heretofore never been provided a valve seat assembly including a centrally located valve stem guide supported by arms of very slim profile wherein fluid flow impedance through the valve seat member is minimal.

SUMMARY OF INVENTION AND ADVANTAGES

The subject invention provides a valve seat assembly comprising an annular valve seat surface concentrically disposed about an axis for sealingly engaging a valve member, means for defining an internal wall extending axially from the valve seat surface and at least partially defining a flow passage through the assembly, an exterior wall adapted to engage and be supported by a support member, guide means disposed in the flow passage for guiding movement of the valve member in a direction parallel to the axis, and at least one arm extending between the guide means and the internal wall to position the guide means in the flow passage. The valve seat assembly is characterized by extraction means disposed axially between the valve seat surface and the arm for engaging a tool inserted into the flow passage to permit the assembly to be removed from the support member in response to a force exerted on the extraction means by the tool.

The subject invention overcomes the deficiencies in the prior art crossarm type valve seat assemblies by providing extraction means between the valve seat surface and the arm, so that the arm itself is not required to withstand the pulling of the removal tool during the removal process and therefore its cross-section may be decreased and streamlined to improve fluid flow characteristics. Additionally, a supplier of valve seat assemblies need only offer one type of removal tool for both crossarm type and full open type valve seat assemblies.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

The embodiment shown in FIGS. 1—4 is particularly suited for use in a slush pump apparatus. A typical slush pump to which reference will be made hereinafter is generally indicated at 10 in FIG. 5. A deck portion 12 is provided in the slush pump 10 for receiving and supporting a valve seat member of the subject invention in a predetermined operating orientation as will be described subsequently.

Referring to the FIGURES, wherein like numerals represent like or corresponding parts throughout the several views, a valve seat assembly of the subject invention is generally shown at 14. The valve seat assembly 14 is of the type for sealing against a associated valve, generally indicated at 16 in FIGS. 4 and 5.

Figure 1:
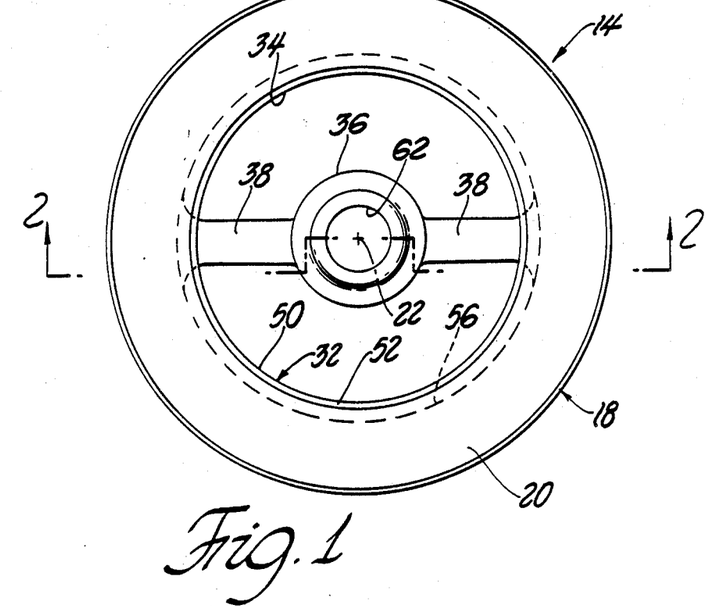
FIG. 1 is a top view the valve seat of the subject invention.
Figure 2:
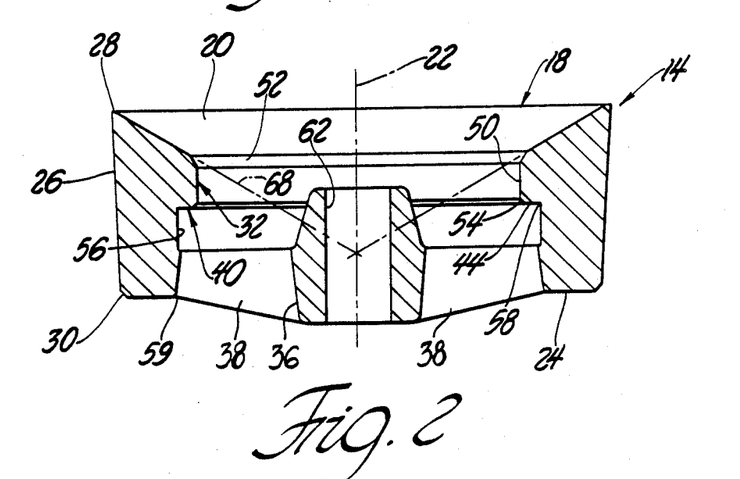
FIG. 2 is a cross-sectional view taken along lines 2—2 of FIG. 1.

As best shown in FIGS. and 2, the subject assembly 14 includes a valve seat member, generally indicated at 18, presenting an annular valve seat surface 20 disposed about a central axis 22. The member 18 is ring-shaped and extends axially from the valve seat surface 20 to a bottom end 24 opposite the valve seat surface 20. The member 18 has a frustoconical exterior wall 26 which tapers radially inwardly from a radially outward edge 28 of the valve seat surface 20 to a radially outward edge 30 of the bottom end 24. Thus, as is well known in the art, the exterior wall 26 is formed with a narrow conical taper to facilitate a tight force fit into the slush pump deck 12.

The member 18 includes an annular internal wall, generally indicated at 32, extending axially from the valve seat surface 20 to the bottom end 24, and defining a continuous flow passage 34 through the assembly 14. During operation of the slush pump 10, the flow of material through the slush pump 10 is regulated by covering and uncovering the flow passage 34 with the valve 16.

A valve guide 36 is disposed centrally in the flow passage 34 for guiding the movement of the valve 16 in a direction parallel to the axis 22. As will be discussed in detail subsequently, the valve guide 36 includes at least one, and preferably two, radial arms 38 that extend between the valve guide 36 and the internal wall 32 to position the valve guide 36 in the flow passage 34.

The subject assembly 14 is characterized by including an extraction means or structure, generally indicated at 40 in FIG. 2, which is disposed between the valve seat surface 20 and the arms 38 of the valve guide 36. The extraction structure 40 is specifically adapted to receive a removal tool, generally indicated at 42 in FIG. 3, inserted into the flow passage 34. In this manner, the assembly 14 may be removed from the slush pump deck 12 by exerting an axially upward force on the extraction structure 40 from the removal tool 42 to overcome the frictional force fit connection between the slush pump deck 12 and the tapered exterior wall 26.

More specifically, the extraction structure 40 includes an abutment surface 44 extending radially from the internal wall 32 and presented in a direction facing axially opposite of the valve seat surface 20. Therefore, if the valve seat surface 20 is said to face upwardly, then the abutment surface 44 will be said to face downwardly. The abutment surface 44 is annular in shape, is centered on the axis 22, and is disposed in a plane perpendicular to the axis 22.

The internal wall 32 of the member 18 includes a first annular surface 50 extending generally straight and axially from a radially inward edge 52 of the valve seat surface 20 to a radially inward edge 54 of the abutment surface 44. As shown in FIG. 2, the edges 52 and 54 are beveled into the first surface 50. The first surface 50 represents the smallest diameter portion of the flow passage 34.

The internal wall 32 also includes a second annular surface 56 which extends axially from a radially outward edge 58 of the abutment surface 44 to a radially inward edge 59 of the bottom end 24. As seen in FIG. 2, the second surface 56 is recessed into the member 18 a radial distance equal to the width of the abutment surface 44. Thus, the abutment surface 44 of the extraction structure 40 comprises the annular surface which interconnects the first surface 50 and the recessed second surface 56. In this manner, the first surface 50 and the abutment surface 44 extend into the flow passage 34 from the second surface 56 to form an annular pulling ledge under which a semicircular flange 48 extending radially outwardly from of the removal tool 42 may hook during the removal process.

As referenced above, the valve guide 36 is centered on the axis 22 in the flow passage 34 for guiding the movement of the valve 16 in a direction parallel to the axis 22. The valve guide 36 is annular and includes a cylindrical bore 62 extending axially through its center. The valve guide 36 is supported in position by the two diametrically opposed arms 38 which, in turn, are fixed to the second surface 56 of the internal wall 32. As shown in FIG. 2, the valve guide 36 is maintained in a position in the flow passage 34 spaced axially below the valve seat surface 20. The arms 38 attach to the valve guide 36 at its lower half and then extend outwardly to adjoin the second surface 56 of the internal wall 32 at a position spaced axially below the abutment surface 44 for allowing the flanges 48 of the removal tool 42 adequate clearance to engage with the abutment surface 44.

Figure 3:
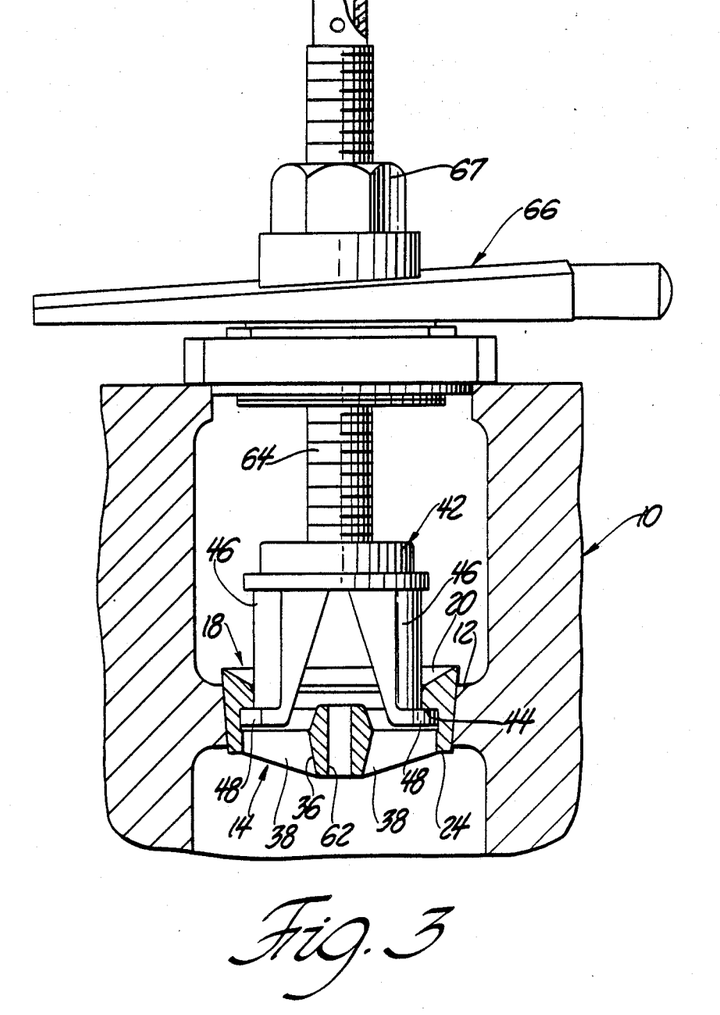
FIG. 3 is a cross-sectional view of the valve seat of the subject invention with a removal tool engaged for extraction of the seat from a slush pump.

As shown in FIG. 3, the removal tool 42 includes two downwardly extending legs 46 adapted for insertion into the flow passage 34 of the member 18. The removal tool legs 46 are semicircular and each includes the outwardly extending flange 48 adapted to engage underneath the abutment surface 44 of the extraction structure 40. The removal tool 42 shown in FIG. 3 is of the type for extracting a full open type valve seat assembly which does not include flow passage obstructions such as the valve guide 36 of the subject assembly 14. Thus, as will be appreciated by those skilled in the art, the removal tool 42 of FIG. 3 is also capable of being inserted completely through the unobstructed flow passage of a prior art full open valve seat assembly for engaging underneath the bottom end with the flanges 48. The removal tool 42 shown in FIG. 3 includes a threaded shaft 64 which extends into the slush pump 10 and fastens to the two legs 46. A wedge assembly, generally indicated at 66, fits over the exposed end of the shaft 64 between an outer surface of the slush pump 10 and a nut 67 secured to the shaft 64. When force is applied to the wedge assembly 66, as by striking one end of the assembly 66, the wedge assembly 66 urges the shaft 64, together with the attached legs 46 and flanges 48, upwardly with great force. Thus, during actuation of the wedge assembly 66, the flanges 48 engage the abutment surface 44 to dislodge the assembly 14 from the slush pump deck 12.

It will be observed that forces are never placed upon the two arms 38 supporting the valve guide 36 during the removal process. Therefore, the two arms 38 may have a narrow and streamlined profile to reduce drag as material is forced through the flow passage 34. This configuration is prohibited in the prior art crossarm type valve seat assemblies because the arms are also required to withstand the pulling force from the removal tool. The subject arms 38, in contrast, need only be of sufficient strength to support the valve guide 36 during operation.

A valve seat assembly such as the subject invention 14 will always be removed in a direction so as to separate the conically tapering exterior wall 26 from the slush pump deck 14. Also, the valve seat surface 20 will always face in the direction of removal. Therefore, the extraction structure 40 of the subject valve seat assembly 14 must be disposed axially below the valve seat surface 20 and axially above the arms 38 of the valve guide 36 so that the removal tool will engage the extraction structure 40 before the removal tool 42 is obstructed by the valve guide 36. In other words, the extraction structure 40 cannot be disposed axially below the arms 38 as the removal tool 42 could not be moved past the arms 38 to reach the extraction structure 40.

As best shown in FIG. 2, the valve seat surface 20 has a frustoconical shape defined by a cone 68 having an apex 70 centered on the axis 22. That is to say, the valve seat surface 20 has an inwardly tapering annular slant toward the apex 70. This frustoconical shape is continuous along the valve seat surface 20, extending from the radially outward edge 28 to the radially inward edge 52.

Figure 4:
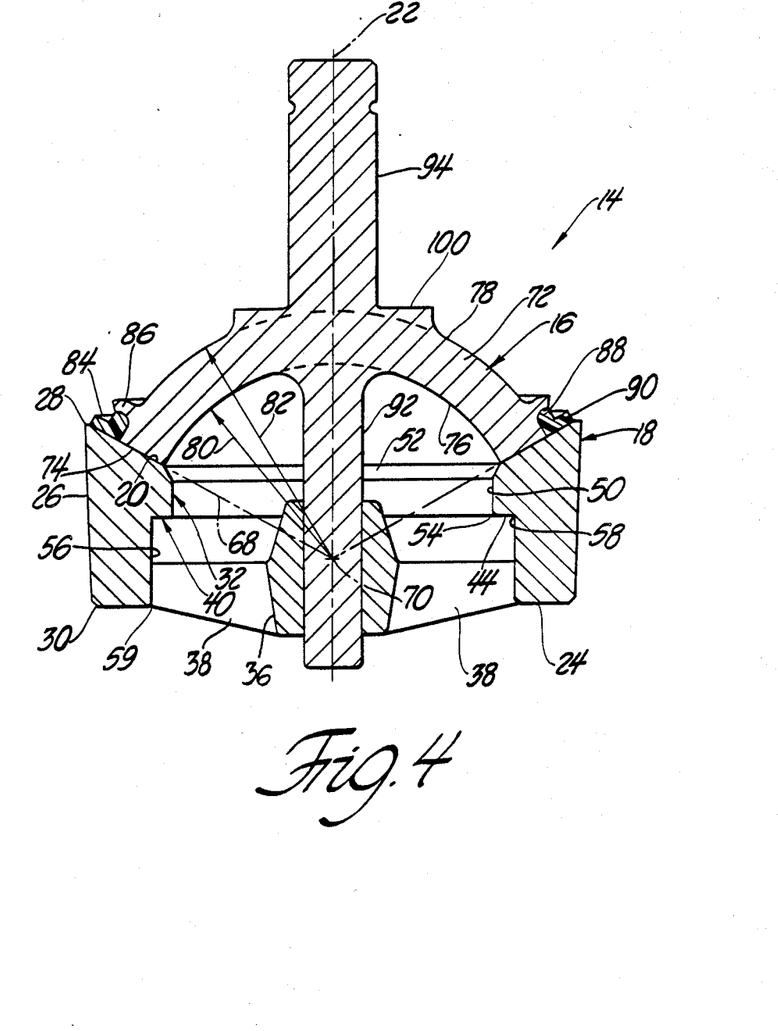
FIG. 4 is a cross-sectional view of the valve seat of the subject invention including an associated valve.

The valve 16 is shown in a fluid sealing position with the valve seat surface 20 in FIG. 4. The valve 16 is axially moveable toward and away from the sealing position for regulating fluid flow through the flow passage 34. More specifically, the valve 16 includes a valve body 72 extending radially outwardly from the axis 22 to a peripheral sealing face 74 which contacts the valve seat surface 20 when in the fluid sealing position of FIG. 4. That is to say, the valve body 72 covers the flow passage 34 to prevent fluid flow through the flow passage 34 by sealing against the valve seat surface 20. The sealing face 74 of the valve body 72 has a frustoconical shape corresponding to the frustoconical shape of the valve seat surface 20. Thus, the cone 68 defining the valve seat surface 20 is coincidental with a cone defining the sealing face 74 when the valve 16 is in the fluid sealing position. Put in other terms, the angle between the axis 22 and the edge of the cone 68 is equal to the angle between the axis 22 and the edge of the cone 35 defining the sealing face 74 of the valve body 72. Thus, when the valve body 72 seats against the valve seat surface 20, the contiguous surfaces 20 and 74 are parallel and perfect a fluid tight seal.

The valve body 72 has a shape which includes a segment of a sphere centered at the apex 70 of the cone 68 defining the frustoconical shape of the sealing face 74. More particularly, the valve body 72 is a thin shell-like member including an inner concave surface 76 having a curvature centered at the apex 70 and an outer convex surface having a curvature concentric about the concave surface 76. A reference line 80 extends from the apex 70 to the concave surface 76 and illustrates the radius of the concave surface 76. A reference line 82 extends from the apex 70 to the convex surface 78 and illustrates the radius of the convex surface 78.

The spherical shell shape of the valve body 72 increases the ability of the valve 16 to withstand fluid pressure acting on the valve body 72. More specifically, the spherical convex surface 78, in cooperation with the parallel sealing face 74 and valve seat surface 20, allow the stresses resulting from a uniformly applied external fluid pressure to be evenly distributed through the valve body 72. In contrast, the valve body shapes taught in the prior art are typically flat across the valve seat surface and thus require a substantial cross-sectional thickness to withstand the foreseeable fluid pressures. Thus, the domed shape of the subject valve body 72 may be formed of less material, and hence lighter, than the prior art valve bodies while still providing adequate resistance to the foreseeable fluid pressures. Additionally, the prior art flat valve bodies are frequently supported from underneath by the arms of the valve guide. Due to the recessed nature of the arms 38 and valve guide 36, however, they do not provide support for the valve body 72. As a consequence, the arms 38 of the subject valve seat assembly 14 need not be machined to provide a support surface for the valve body 72. Further, the dimensions of the arms 38 need not be increased to withstand the load of the valve body 72.

The even, or uniform, stress distribution about the exterior convex surface 78 of the subject valve body 72 is a result of the well known physical principal that a hollow sphere subject to uniform external loading does not experience bending moments or tensile stresses. Instead, a uniform compressive stress, tangent to the convex surface 78, is uniformly distributed about the valve body 72. This phenomena is relied upon in forming the shape of the valve body 72 so that the valve body 72 may have a relatively thin cross-section, i.e., thin shell, when compared to valve bodies in the prior art, without requiring underneath support on the arms 38.

The valve body 72 also includes an elastomeric sealing insert, generally indicated at 84, disposed adjacent the sealing face 74 of the valve body 72 for fluid sealing engagement with the valve seat surface 20 of the member 18 when the valve 16 is in the fluid sealing position. That is, the sealing insert 84 is disposed adjacent the convex surface 78 of the valve body 72 and engages the valve seat surface 20 when the valve 16 moves into the fluid sealing position to improve the fluid seal. The valve body 72 includes an annular lip 86 which extends radially outwardly from the convex surface 78, near the sealing face 74, which forms an annular groove or channel for receiving the sealing insert 84.

More specifically, the sealing insert 84 includes a bead portion 88 disposed between the lip 86 and the convex surface 78 of the valve body 72 and is retained in the annular groove formed by the lip 86. An integral flexible cantilever portion 90 extends radially outwardly from the bead portion 88 to contact the valve seat surface 20 during operation. Preferably, the cantilever portion 90 of the sealing insert 84 extends away from the axis 22 at a greater frustoconical angle than the frustoconical angle of the sealing face 74. In this manner, as the valve 16 approaches the fluid sealing position, the sealing insert 84 contacts the valve seat surface 20 prior to the sealing face 74 of the valve body 72, which increases the fluid sealing properties of the valve 16 and reduces wear on the valve body 72.

The valve 16 also includes a cylindrical lower stem 92 centered along the axis 22 and extending axially from the concave surface 76 of the valve body 72 for sliding relative movement in the bore 62 of the valve guide 36. The valve 16 further includes a cylindrical upper stem 94 which is centered about the axis 22 and extends axially from the convex surface 78 of the valve body 72. Thus, the lower stem 92 and the upper stem 94 are coaxially disposed and extend in opposite directions from the valve body 72.

Figure 5:
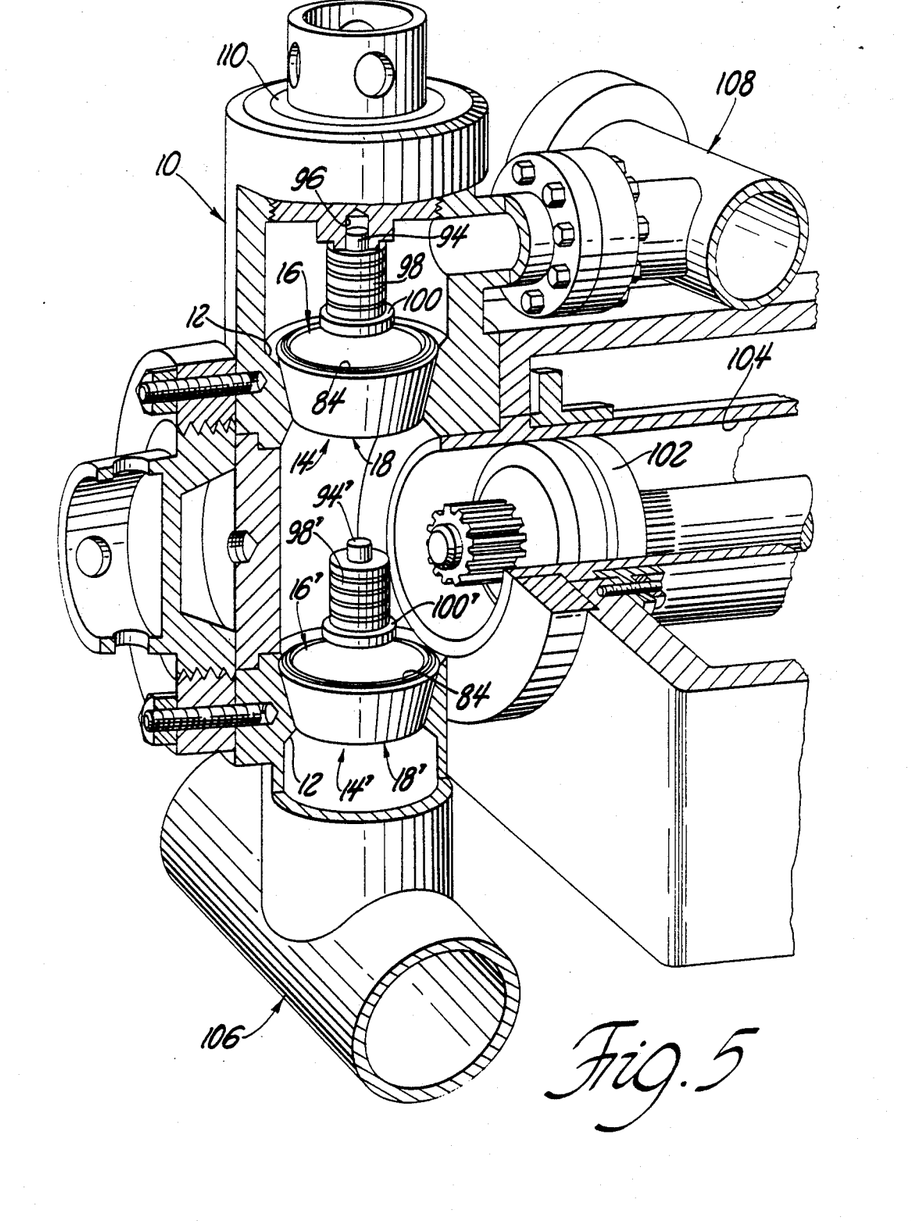
FIG. 5 is a partially-sectioned view of a slush pump including the valve seat of the subject invention.

As shown in FIG. 5, the upper stem 94 is adapted to be received in an upper stem guide 96 disposed in the slush pump 10. (Two valve seat assemblies 14, 14' are shown in FIG. 5, with only one including the upper stem guide 96. It will be appreciated that all valve seat assemblies in the slush pump 10 include an associated upper stem guide 96.) Thus, as the slush pump 10 is in operation, the valve 16 is urged toward and away from the fluid sealing position and restrained to axial movement by the lower 92 and upper 94 stems reciprocating within respective guides 36, 96.

A compression spring 98 is disposed about the upper stem 94 of the valve 16 and extends between the upper stem guide 96 of the slush pump 10 and an annular spring platform 100 of the valve body 72. The spring platform 100, as best shown in FIG. 4, is centered about the axis 22 and disposed on the convex surface 78. The spring platform 100 has a greater radially outward projection than the upper stem 94 as necessitated by the disposition of the compression spring 98 about the upper stem 94. Thus, during operation, the compression spring 98 continually urges the valve 16 into the fluid sealing position by applying pressure to the spring platform 100.

Referring again to FIG. 5, the flow regulating operation of the preferred embodiment of the subject invention will be addressed presently. A typical slush pump 10 is shown including a reciprocating piston 102 slidably disposed in an associated cylinder 104. At the head of the cylinder 104 is shown a common valve arrangement wherein a suction valve seat assembly 14' is disposed axially underneath a discharge valve seat assembly 14. (For clarity, prime designations have been added to the reference numbers of the suction valve assembly.) This arrangement is commonly referred to as an "over-/under" arrangement. Other valve arrangements are possible wherein the suction valve seat assembly 14' and discharge valve seat assembly 14 are not axially positioned one under the other. An intake conduit system 106 is provided for supplying the slush material to be pumped to the slush pump 10, and a discharge conduit system 108 is provided for directing the pumped slush material from the slush pump 10 to a suitable waste collection site.

As the piston 102 moves rearwardly in the cylinder 104, away from the head, a suction is created causing a substantial negative pressure differential between the head of the cylinder 104 and the intake conduit system 106. This negative pressure differential urges the suction valve 16' away from its associated valve seat surface 20', thus overcoming the compression spring 98', to allow the slush material to be drawn into the head and cylinder 104. It will be appreciated that during this suction, or intake, operation, the negative pressure differential urges the discharge valve 16 into even tighter fluid sealing engagement against its associated valve seat surface 20. When the piston 102 reaches the end of its rearward stroke, the suction creating the negative pressure differential subsides, thus allowing the compression spring 98' of the suction valve assembly 14, to urge the valve 16' back against its associated valve seat surface 20'. Thus, after the suction valve 16' recloses, a quantity of slush material is momentarily trapped in the head and cylinder 104, between the suction 14, and discharge 14 valve seat assemblies and the piston 102.

As the piston 102 begins to move forwardly in the cylinder 104 toward the head, a positive pressure differential is created between the cylinder head and the discharge conduit 108 which urges the discharge valve 16 away from its associated valve seat surface 20, overcoming the compression spring 98, to open the flow passage 34 through the discharge valve seat assembly 14. Thus, as the piston 102 moves forwardly in the cylinder 104, the entrapped slush material is pumped into the discharge conduit system 108 through the discharge valve seat assembly 14. In similar manner to that noted above, the positive pressure differential has the effect on the suction valve seat assembly 14' of urging the suction valve 16' more tightly against its associated valve seat surface 20'.

It will be appreciated that this suction and discharge slush pumping operation is performed in rapid cyclic succession and often in cooperation with other pistons and associated cylinders communicating with the same intake 106 and discharge 108 conduit systems.

In the embodiment shown in FIG. 5, an access plate 110 is shown disposed above the discharge valve seat assembly 14. This access plate 110 is removed for inspection and maintenance of the two valve seat assemblies 14, 14'. Thus, as described above in connection with FIG. 3, to remove the discharge valve seat assembly 14 from the slush pump deck 12, the access plate 110 is removed and the discharge valve 16 and compression spring 98 are lifted out of the slush pump 10. The removal tool 42 is then inserted into the discharge flow passage 34 and manipulated to engage the extraction structure 40. The wedge assembly 66 is next actuated to dislodge the discharge valve seat assembly 14 from the slush pump 12. After this, the suction valve 16' of the suction valve seat assembly 14' is removed along with its associated compression spring 98', after which the removal tool 42 is extended into the suction flow passage 34'. Upward axial force is applied in the same manner by the removal tool 42 against the extraction structure 40' to remove the suction valve seat assembly 14' from the slush pump deck 12. In this manner, extraction of the valve seat assemblies 14, 14' from the slush pump 10 can be easily performed without applying force to the arms 38 or the valve guide 36. As referenced above, this is particularly advantageous in that the arms 38 can be formed of a narrow streamlined profile.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A valve seat assembly comprising an annular valve seat surface concentrically disposed about an axis for sealingly engaging a valve member, means for defining an internal wall extending axially from said valve seat surface and at least partially defining a flow passage through said assembly, an exterior wall adapted to engage and be supported by a support member, guide means disposed in said flow passage for guiding movement of the valve member in a direction parallel to said axis, and at least one arm extending between said guide means and said internal wall to position said guide means in said flow passage, said valve seat assembly being characterized by extraction means disposed axially between said valve seat surface and said arm for engaging a tool inserted into said flow passage to permit said assembly to be removed from the support member in response to a force exerted on said extraction means by the tool, said extraction means comprising an abutment surface facing generally away from said valve seat surface, a radially inner edge of said abutment surface being spaced axially from a radially inner edge of said valve seat surface, an annular surface extending from said radially inner edge of said valve seat surface to said radially inner edge of said abutment surface said annular surface being of constant diameter.

2. An assembly as set forth in claim 1, wherein a valve seat member presents said valve seat surface, said exterior wall and said internal wall, and includes a bottom end opposite said valve seat surface, further characterized by said internal wall including a second surface disposed annularly about said axis and extending axially from a radially outward edge of said abutment surface to a radially inward edge of said bottom end.

3. An assembly as set forth in claim 2 further characterized by said guide means including a cylindrical bore extending axially therethrough.

4. An assembly as set forth in claim 3 further characterized by said arm extending radially outwardly from said guide means to said second surface of said internal wall.

5. An assembly as set forth in claim 4 further characterized by said exterior wall of said member extending continuously axially from a radially outward edge of said valve seat surface to a radially outward edge of said bottom end.

6. An assembly as set forth in claim 5 further characterized by said assembly including an associated valve means axially moveable toward and away from a fluid sealing position contiguous with said valve seat surface for regulating fluid flow through said flow passage.

7. An assembly as set forth in claim 6 further characterized by said valve means including a valve body extending radially outwardly from said axis to a peripheral sealing face contiguous with said valve seat surface when in said fluid sealing position, said sealing face having a frustoconical shape corresponding to a frustoconical shape of said valve seat surface whereby said cone defining said valve seat surface is coincidental with a cone defining said sealing face when said valve means is in said fluid sealing position.

8. A valve seat assembly comprising an annular valve seat surface concentrically disposed about an axis for sealingly engaging a valve member, means for defining an internal wall extending axially from said valve seat surface and at least partially defining a flow passage through said assembly, an exterior wall adapted to engage and be supported by a support member, guide means disposed in said flow passage for guiding movement of the valve member in a direction parallel to said axis, and at least one arm extending between said guide means and said internal wall to position said guide means in said flow passage, said valve seat assembly being characterized by extraction means disposed axially between said valve seat surface and said arm for engaging a tool inserted into said flow passage to permit said assembly to be removed from the support member in response to a force exerted on said extraction means by the tool, said extraction means comprising an abutment surface facing generally away from said valve seat surface, a radially inner edge of said abutment surface being spaced axially from a radially inner edge of said valve seat surface, an annular surface extending from said radially inner edge of said valve seat surface to said radially inner edge of said abutment surface, said abutment surface being disposed in a plane perpendicular to said axis.

9. An assembly as set forth in claim 8 further characterized by said abutment surface being annular and concentric with said axis.

10. An assembly as set forth in claim 9 further characterized by said valve seat surface having a frustoconical shape defined by a cone having an apex centered on said axis.

11. A valve seat assembly comprising an annular valve seat surface concentrically disposed about an axis for sealingly engaging a valve member, means for defining an internal wall extending axially from said valve seat surface and at least partially defining a flow passage through said assembly, an exterior wall adapted to engage and be supported by a support member, guide means disposed in said flow passage for guiding movement of the valve member in a direction parallel to said axis, and at least one arm extending between said guide means and said internal wall to position said guide means in said flow passage, said valve seat assembly being characterized by extraction means disposed axially between said valve seat surface and said arm for engaging a tool inserted into said flow passage to permit said assembly to be removed from the support member in response to a force exerted on said extraction means by the tool, said extraction means comprising an abutment surface facing generally away from said valve seat surface, a radially inner edge of said abutment surface being spaced axially from a radially inner edge of said valve seat surface, an annular surface extending from said radially inner edge of said valve seat surface to said radially inner edge of said abutment surface, a valve seat member presenting said valve seat surface, said exterior wall and said internal wall, and includes a bottom end opposite said valve seat surface, further characterized by said internal wall including a second surface disposed annularly about said axis and extending axially from a radially outward edge of said abutment surface to a radially inward edge of said bottom end, said guide means including a cylindrical bore extending axially therethrough, said arm extending radially outwardly from said guide means to said second surface of said internal wall, said exterior wall of said member extending continuously axially from a radially outward edge of said valve seat surface to a radially outward edge of said bottom end, said assembly including an associated valve means axially movable toward and away from a fluid sealing position contiguous with said valve seat surface for regulating fluid flow through said flow passage, said valve means including a valve body extending radially outwardly from said axis to a peripheral sealing face contiguous with said valve seat surface when in said fluid sealing position, said sealing race having a frustoconical shape corresponding to a frustoconical shape of said valve seat surface whereby said cone defining said valve seat surface is coincidental with a cone defining said sealing face when said valve means is in said fluid sealing position, said valve body having a shape including a segment of a sphere centered at an apex of said cone defining said frustoconical shape of said sealing face.

12. An assembly as set forth in claim 11, wherein said valve body includes a concave surface presented adjacent said member and a convex surface opposite said concave surface, further characterized by said valve means including a cylindrical lower stem centered along said axis and extending axially from said concave surface of said valve body for sliding relative movement in said bore of said barrel.

13. An assembly as set forth in claim 12 further characterized by said valve means including an elastomeric sealing insert disposed adjacent said sealing face of said valve body for fluid sealing engagement with said valve seat surface of said member when in said fluid sealing position.

14. An assembly as set forth in claim 13 further characterized by said sealing insert disposed adjacent said convex surface of said valve body.

15. An assembly as set forth in claim 14 further characterized by said valve body including an annular lip extending radially outwardly from said convex surface adjacent said sealing face for receiving said sealing insert.

16. An assembly as set forth in claim 15 further characterized by said sealing insert including a bead portion disposed between said lip and said convex surface of said valve body, and a flexible cantilever portion extending radially outwardly from said bead portion.

17. An assembly as set forth in claim 16 further characterized by said valve means including a cylindrical upper stem centered about said axis and extending axially from said convex surface of said valve body.

18. An assembly as set forth in claim 17 further characterized by said valve means including an annular spring platform centered about said axis and disposed on said convex surface and having a greater radially outward projection than said upper stem.

* * * * *